United States Patent
Cummings et al.

(10) Patent No.: US 8,135,879 B2
(45) Date of Patent: Mar. 13, 2012

(54) FOUR-SLOT ASYNCHRONOUS COMMUNICATION MECHANISM WITH INCREASED THROUGHPUT

(75) Inventors: Rodney W. Cummings, Austin, TX (US); Eric L. Singer, Austin, TX (US)

(73) Assignee: National Instruments Corporation, Austin, TX (US)

( * ) Notice: Subject to any disclaimer, the term of this patent is extended or adjusted under 35 U.S.C. 154(b) by 474 days.

(21) Appl. No.: 12/418,131

(22) Filed: Apr. 3, 2009

(65) Prior Publication Data

US 2010/0257291 A1 Oct. 7, 2010

(51) Int. Cl.
- G06F 3/00 (2006.01)
- G06F 15/16 (2006.01)
- G11C 7/00 (2006.01)
- G11C 7/22 (2006.01)
- H04L 7/00 (2006.01)

(52) U.S. Cl. ............ 710/29; 710/1; 710/5; 710/18; 710/19; 365/189.011; 365/189.04; 365/189.17; 365/220; 365/221; 375/370; 370/298; 370/304; 377/66; 709/203

(58) Field of Classification Search ............ 375/370; 370/298, 304; 377/66; 710/1, 5, 18, 19, 710/29; 365/189.011, 189.04, 189.17, 220, 365/221; 709/203

See application file for complete search history.

(56) References Cited

U.S. PATENT DOCUMENTS

| | | | |
|---|---|---|---|
| 4,875,224 A * | 10/1989 | Simpson | 375/371 |
| 5,469,549 A * | 11/1995 | Simpson et al. | 709/213 |
| 6,728,795 B1 | 4/2004 | Farazmandnia et al. | |
| 6,732,255 B1 | 5/2004 | Ling et al. | |
| 6,813,652 B2 | 11/2004 | Stadler et al. | |
| 6,941,390 B2 | 9/2005 | Odom | |

(Continued)

OTHER PUBLICATIONS

U.S. Appl. No. 12/418,261, entitled "Four-Slot Asynchronous Communication Mechanism with Decreased Latency", by Eric L. Singer, filed on Apr. 3, 2009.

H.R. Simpson; "Four-Slot Fully Asynchronous Communication Mechanism"; IEEE Proceedings, vol. 137, No. 1, Jan. 1990; 14 pages.

(Continued)

*Primary Examiner* — Tanh Nguyen

(74) *Attorney, Agent, or Firm* — Meyertons Hood Kivlin Kowert & Goetzel, P.C.; Jeffrey C. Hood

(57) ABSTRACT

System and method for a four-slot asynchronous communication mechanism with increased throughput. The system may include a host system and a client device. The host may comprise a data structure with four (two pairs of) slots and first information indicating a status of read operations from the data structure by the host. The client may read the first information from the host. The client may read second information from a local memory. The second information may indicate a status of write operations to the data structure by the client. The client may determine a slot of the data structure to be written. The slot may be determined based on the first information and the second information and may be the slot which has not been written to more recently of the pair of slots which has not been read from most recently. The client may increment a value of a counter. The value of the counter may be useable to indicate which slot has been written to most recently. The client may write data to the determined slot in the data structure on the host. The data may include the value of the counter. The client may update the second information in the local memory to indicate that the determined slot has been written to most recently.

19 Claims, 9 Drawing Sheets

U.S. PATENT DOCUMENTS

| | | |
|---|---|---|
| 7,191,257 B2 | 3/2007 | Ali Khan et al. |
| 7,240,231 B2 | 7/2007 | Conway |
| 7,290,069 B2 | 10/2007 | Curtis |
| 7,542,867 B2 | 6/2009 | Steger et al. |
| 2009/0055837 A1* | 2/2009 | Campbell .................... 719/313 |

OTHER PUBLICATIONS

John Rushby; "Model Checking Simpson's Four-Slot Fully Asynchronous Communication Mechanism"; CSL Technical Report; Jul. 3, 2002; 45 pages.

* cited by examiner

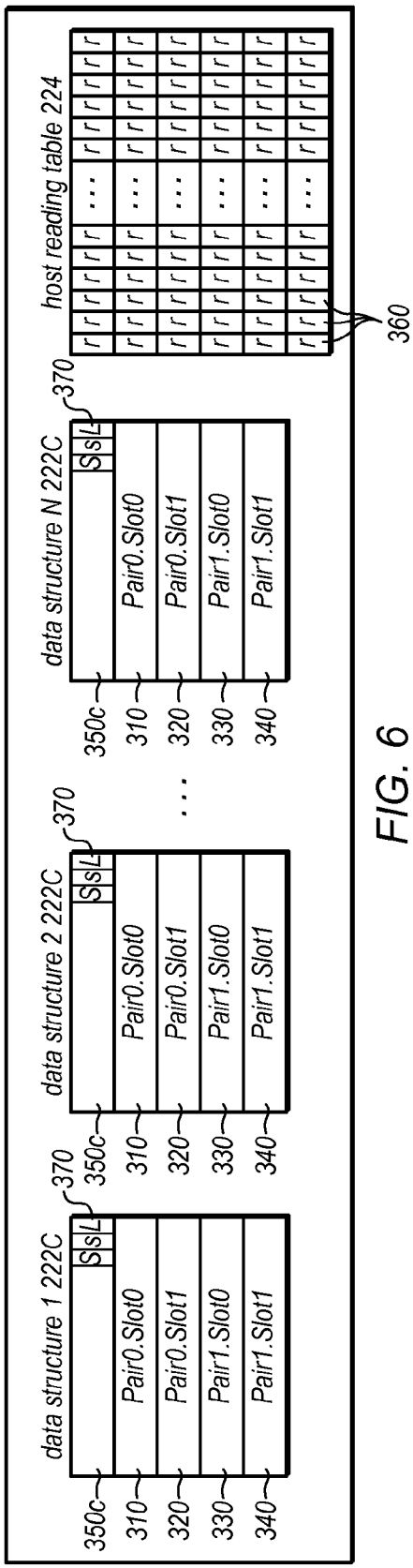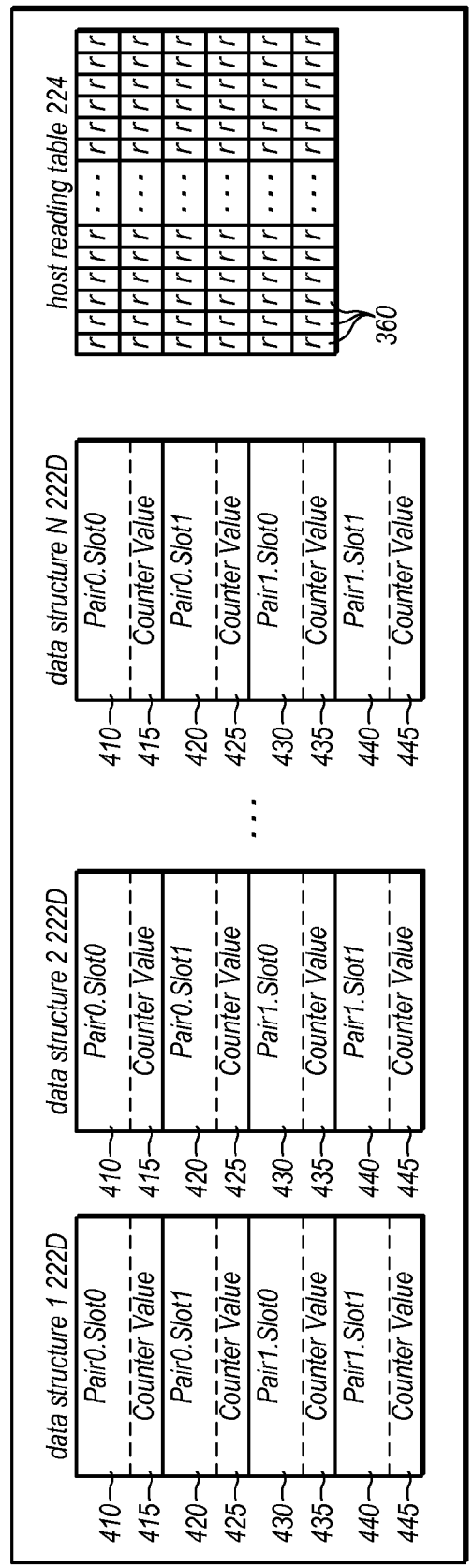
FIG. 6
FIG. 7

FOUR-SLOT ASYNCHRONOUS COMMUNICATION MECHANISM WITH INCREASED THROUGHPUT

FIELD OF THE INVENTION

The present invention relates generally to computer systems and more particularly to a system and method for transferring data from a client device to a host system.

DESCRIPTION OF THE RELEVANT ART

Direct Memory Access (DMA) is a process by which a DMA subsystem within or coupled to a computer system (host) can access system memory for reading and/or writing independently of the system's central processor. This leaves the system processor free to perform other tasks. Similarly, if the DMA subsystem is in an embedded system with its own embedded processor, DMA may allow the embedded processor to continue with its specific function without diverting unnecessary resources to transferring data to or from the host. This can be particularly useful in real-time computing situations.

DMA can be initiated on the host side ("pull DMA"), e.g., where the host system initiates the DMA to transfer data from the client to the host, or on the client side ("push DMA"), e.g., where the client initiates the DMA to transfer data from the client to the host. Additionally, in some cases, it may be possible that the DMA subsystem is located either on the host side (e.g., where the host retrieves data from the client), or on the client side (e.g., where the client sends data to the host)

When the host desires to read the data that is being written by the client in real time, there is a coherency issue that must be solved. Specifically, if the host were to read the data while the client were writing the data, the host could read partially old data (e.g., a combination of partially new and partially old data), and therefore potentially incoherent data. Thus, a mechanism to ensure the coherency of the data is required.

One approach to this involves locking. In this case the client or the host may set a 'lock' when performing a read or write operation, such that the other side cannot access the data until the read or write operation is complete. However, locks can cause timing interference, including jitter, latency, and priority inversion.

Some alternatives to locking have been suggested. So-called 'lock-free algorithms' do not use synchronization primitives (i.e. locking), instead often using, for example, Compare-and-Swap instructions in the polling loop. A further requirement can be made that all operations be completed in a finite number of steps; such algorithms are known as 'wait-free algorithms'. Wait-free algorithms are also necessarily lock-free.

One such solution involves having multiple data slots at each host memory address; in theory, this allows the host to read the most-recently-completely-written data from one slot while the client may write to a different slot. Various two- and three-slot algorithms have been attempted. However, under certain circumstances, including for example when the host's reading rate is different from the client's writing rate, the operations can still overlap for a given slot, so data incoherence is still possible. A four-slot solution was proposed by H. R. Simpson (Four-slot fully asynchronous communication mechanism, published in the IEE Proceedings, Vol 137, Pt. E, No 1, January 1990, which is hereby incorporated by reference as though fully set forth herein).

This four-slot algorithm successfully provides a guaranteed-coherent, fully asynchronous, wait-free communication mechanism. However, this method does require significant communication overhead to ensure full asynchronicity and data coherence. According to this four-slot algorithm, the writing device must perform one read from the host and two writes to the host for each actual data transfer. This can reduce the overall throughput and increase the latency of the data transfer, especially when performed over a high-latency bus (such as PCI, or PCI-Express). Thus, improvements in the field are desired.

SUMMARY OF THE INVENTION

Various embodiments are presented of a system and method for a four slot asynchronous communication mechanism with improved throughput.

The system may include a host system and a client device. The host system may include a processor and a memory medium. The host memory medium may include one or more data structures, which may include four slots for data and may be organized as two pairs of slots. Each slot of the data structure may include a counter value, which may be useable to indicate which slot has most recently been written to. The counter value of each slot may make up the last portion of that slot. The one or more data structures may further each include a header, which may include information for each data structure ("reading" information) indicating which pair of slots has been read from most recently by the host. The "reading" information may comprise one or more bits.

The client device may include a functional unit and a memory medium. The client device may also comprise a DMA device for transferring data from the client device (e.g., measurement data acquired by the client device) to the host system. The functional unit may be a programmable hardware element, or alternatively, the functional unit may be a processor and a memory medium. In the case where the functional unit is a processor and a memory medium, the memory medium of the functional unit and the memory medium of the client may be the same memory medium, or different memory mediums, as desired. The client device may include a counter, e.g., which may be stored on the memory medium. The value of the counter may be incremented to a new counter value before every write operation that the client performs. The client memory medium may include information ("latest" information) indicating, for each data structure on the host, which pair of slots has been written to most recently and which slot of each pair of slots has been written to more recently. The "latest" information may comprise one or more bits.

One embodiment includes a method for the client device to transfer data to the host system. According to various embodiments of the method, the following steps may be performed. The client may read the "reading" information from the host memory for a data structure in the host memory, which may indicate that the host has read from a first pair of slots of that data structure most recently. The client may also read the "latest" information from local memory for that data structure. The "latest" information may indicate, for example, that of the second pair of slots, a first slot has been written to more recently. The client may also increment the counter. The client may then write data to a slot (e.g. the second slot of the second pair of slots) of the data structure in the host memory. The client may write the data to the particular slot of the data structure based on the "reading" information and the "latest" information. The data may include the current value of the counter. The value of the counter may be included in the data as the last portion of the data. The client may finally update the "latest" information in local memory to indicate which slot has been written to most recently and which pair of slots has been written to most recently.

The method for the client to transfer data to the host may be repeatable. That is, the method may further include performing any or all of the following steps above, e.g., in an iterative fashion, according to various embodiments. The client may read the "reading" information from the host memory for the same data structure in the host memory. The "reading" information may be the same as previously, e.g. may indicate that the first pair of slots has still been read from most recently, or alternatively, may indicate that the second pair of slots has been read from most recently by the host. The client may read the "latest" information from local memory for the data structure in the host memory. The "latest" information may indicate that the slot which the client has just written to (e.g. the second slot of the second pair) has been most recently written to; the "latest" information may also indicate that a slot of the first pair (e.g., a first slot of the first pair) has been written to more recently than the other (e.g., a second) slot of the first pair. The client may increment the counter. The client may then write (e.g., new) data to a slot of the data structure in the host memory. The slot written to in this case may be a different slot than the slot to which the client has just written. If the "reading" information indicated that the first pair had still been read from most recently, the slot written to may be, e.g., the first slot of the second pair of slots. Alternatively, if the "reading" information indicated that the second pair of slots had been read from most recently by the host, the slot written to may be, e.g., the second slot of the second pair of slots. The client may then update the "latest" information in local memory to indicate which slot has been written to most recently and which pair of slots has been written to most recently.

Various embodiments of the system may include a memory medium comprising program instructions executable by a processor to perform the foregoing method for the client to transfer data to the host in various embodiments. Further embodiments of the system may include the client device as described above wherein the functional unit may be configured to perform the foregoing method for the client to transfer data to the host in various embodiments.

One embodiment includes a method for the host to determine a location of most recently transferred data. According to various embodiments of the method, the following steps may be performed. The host may read the counter value of each slot in a data structure in the host memory. The host may use the counter values of each slot to determine which pair of slots contains the slot which has been written to most recently. The host may update the "reading" information in the host memory for the data structure in the host memory to indicate that the pair of slots determined to have been written to most recently have been read from most recently. The host may read the counter value of each slot in the pair of slots determined to contain the slot which has been written to most recently. The host may use the counter values of each slot in the determined pair of slots to determine which slot of the determined pair of slots has been written to most recently. The host may then read data from the determined slot of the determined pair of slots.

Various embodiments of the system may include a memory medium comprising program instructions executable by a processor to perform the foregoing method for the host to determine the location of most recently transferred data in various embodiments. Further embodiments of the system may include the host system as described above, wherein the host memory medium includes program instructions executable by the host processor to perform the foregoing method.

Various embodiments may include a system including both the host system and the client device. The host system may be electrically coupled to the client device to allow communication. The host may be configured as described above. That is, the host may include a processor and a memory medium where the memory medium stores one or more data structures as described above, "reading" information as described above for each data structure, and program instructions executable by the host processor to perform the method for the host to determine a location of most recently transferred data as described above in various embodiments. Similarly, the client device may be configured as described above. That is, the client may include a functional unit and memory medium where the memory medium stores "latest" information as described above, a counter as described above, and where the functional unit is configured to perform the method for the client to transfer data to the host as described above in various embodiments.

BRIEF DESCRIPTION OF THE DRAWINGS

A better understanding of the present invention can be obtained when the following Detailed Description of the Embodiments is read in conjunction with the following drawings, in which:

FIG. 6 depicts a representation of a plurality of data structures and a table as might be stored in a host memory according to one embodiment;

FIG. 7 depicts a representation of a plurality of data structures and a table as might be stored in a host memory according to one embodiment;

FIGS. 10A and 105B depict flowchart diagrams illustrating alternate embodiments of a method for a client to transfer data to a host;

Figure 1:
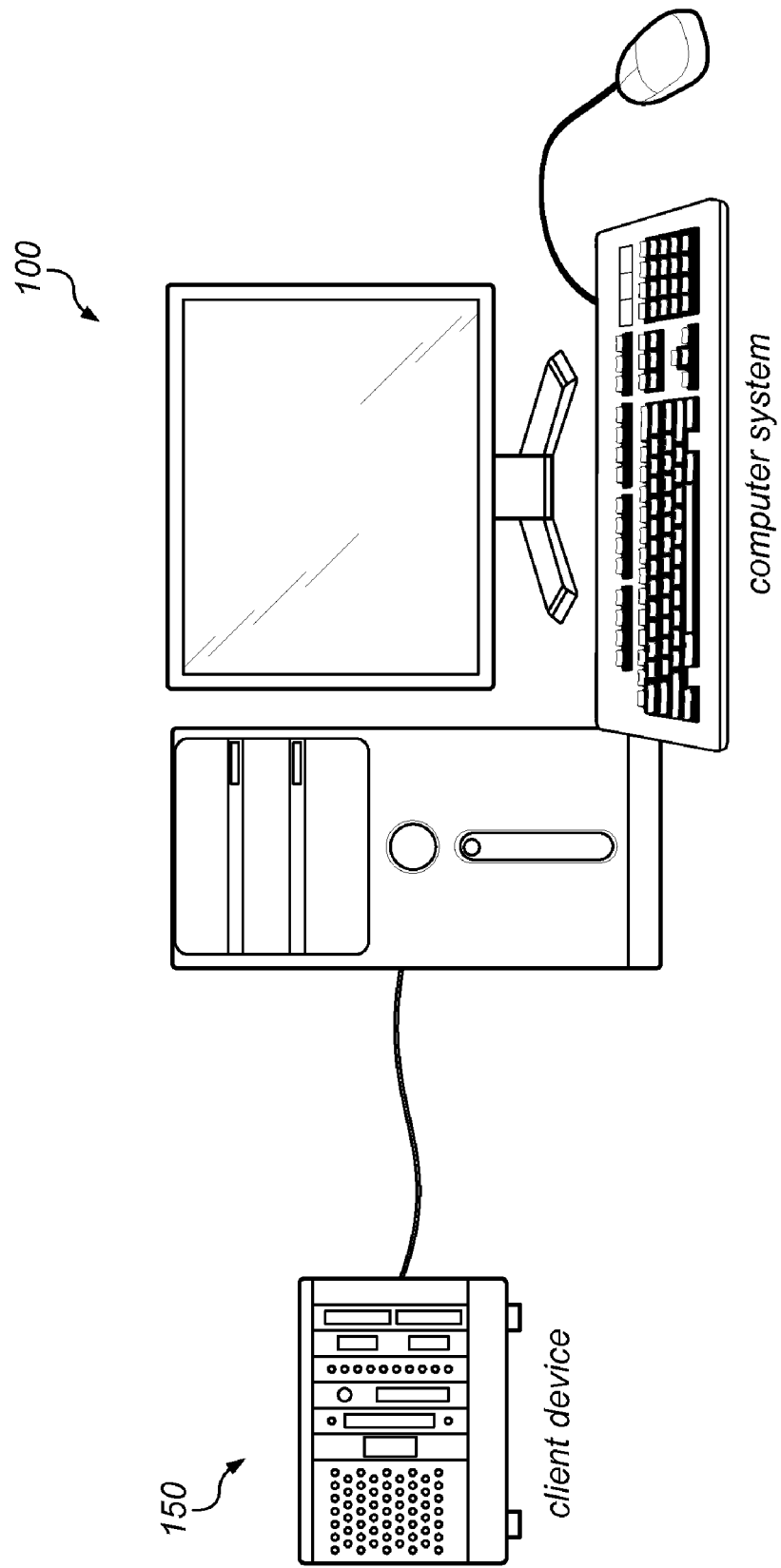
FIG. 1 depicts a host system and a client device according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition (DAQ) devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Functional Unit—may include a processor and memory or a programmable hardware element. The term "functional unit" may include one or more processors and memories and/or one or more programmable hardware elements. As used herein, the term "processor" is intended to include any of types of processors, CPUs, microcontrollers, or other devices capable of executing software instructions.

FIG. 1—Exemplary Host System and Client Device

FIG. 1 illustrates a host system 100 (or simply "host") that is coupled to a client device 150 according to one embodiment. As shown in FIG. 1, the host system may be a computer system 100. The computer system 100 may include a display device operable to display a program (e.g., a graphical user interface to the program) as the program is created and/or executed as well as various input devices. The graphical user interface may comprise any type of graphical user interface, e.g., depending on the computing platform.

The computer system 100 may include at least one memory medium on which one or more computer programs or software components according to one embodiment of the present invention may be stored. The memory medium may also store operating system software, as well as other software for operation of the computer system. The computer system may additionally have one or more hardware components. In some embodiments, the computer system may include one or more DMA subsystems, e.g., for transferring data from a client device to the computer system. However, in other embodiments, the computer system may not include a DMA subsystem The client device 150 may be a measurement device. The client device 150 may include a chassis, for example a PCI or a PXI chassis. The chassis may include one or more slots which may be configured to receive a corresponding one or more pluggable cards. For example, the cards may be any of various types, e.g., cards for controlling or interacting with instruments or devices, I/O cards for receiving and/or manipulating data, computer cards (e.g., including a processor and memory medium or configurable hardware unit) which may be configured to perform computational functions, and/or other types of cards, as desired. One or more of the plurality of cards may include a configurable or programmable hardware element which may be configured to perform one or more functions.

The chassis may include a backplane. In some embodiments, the backplane may include a programmable hardware unit, such as a field programmable gate array (FPGA), which may be usable for configuring the chassis to perform one or more functions (e.g., using a subset or all of a plurality of cards inserted into the chassis).

The backplane may provide one or more busses, e.g. PCI or PXI busses, for communicating with (and between) the plurality of cards. The computer system 100 may be usable to configure and/or control the chassis. For example, the computer system 100 may be used to configure one or more of the cards inserted in the chassis. In further embodiments, as indicated above, the backplane of the chassis may include a configurable hardware unit (e.g., an FPGA), and the computer system 100 may be usable to configure the programmable hardware unit (e.g., with a graphical program, such as one created using LabVIEW® provided by National Instruments Corporation, as is described in U.S. Pat. No. 6,219,628

B1, whose title was "System and Method for Configuring an Instrument to Perform Measurement Functions Utilizing Conversion of Graphical Programs into Hardware Implementations", and whose authors were Jeffrey L. Kodosky, Hugo Andrade, Brian K. Odom, and Cary P. Butler, and which is hereby incorporated by reference as though fully set forth herein). Thus, the computer system 100 may be usable to control or configure the chassis to perform one or more functions (e.g., industrial or measurement functions).

Embodiments of the present invention may be involved with performing test and/or measurement functions; controlling and/or modeling instrumentation or industrial automation hardware; modeling and simulation functions, e.g., modeling or simulating a device or product being developed or tested, etc.

In some embodiments, the client device may include a DMA subsystem, e.g., for transferring data from the client to the host. However, in other embodiments, e.g., if the host includes a DMA subsystem for transferring data from the client to the host, the client device may not include a DMA subsystem. In some embodiments, both the client and the host may include DMA subsystems.

It is worth noting that while FIG. 1 depicts the client device 150 as physically distinct and separated from the computer system 100, various embodiments are also possible where the client device 150 is located in the same chassis or case as the host 100. Generally speaking a "client device" (or simply "client") 150 may be any hardware subsystem which may be coupled to a computer system and capable of communicating with the host system 100 and should not be limited only to the client devices depicted or described above. Further worth noting is that while FIG. 1 shows one (1) client device coupled to one (1) host system, other embodiments with different numbers of either clients devices, host systems, or both, are also envisioned.

Other examples of a client-host system might include real-time computing situations and/or embedded systems. Some such embodiments could include, for example, a vehicle with a host 100 (e.g. a microcontroller) communicating with one or more client devices 150 (e.g. speedometer, tachometer, etc) over a bus such as controller-area network (CAN) or FlexRay.

Many of the embodiments described above may include transferring data (e.g. acquired in performing test and/or measurement functions) from the client to the host, for example may include transferring the latest data acquired to a data structure on the host according to one or more embodiments of the present invention.

It should also be noted that in various embodiments, the four slot data transfer mechanism described herein may be used in other contexts in addition to or instead of a data transfer between a client and a host. For example, in one embodiment, the four slot data transfer mechanism described herein may be used to transfer data locally within a host system, or within another device, among other possibilities. One such embodiment might include a data transfer (e.g., a DMA) from a client device to a host buffer, from which a local (host) process might, e.g., parse the data and use the four slot data transfer mechanism to move it to the host tables from which the host (e.g., a host processor) might then read the data. Other embodiments might not require a client-host data transfer at all, e.g., may only involve local data transfer(s).

Figure 2:
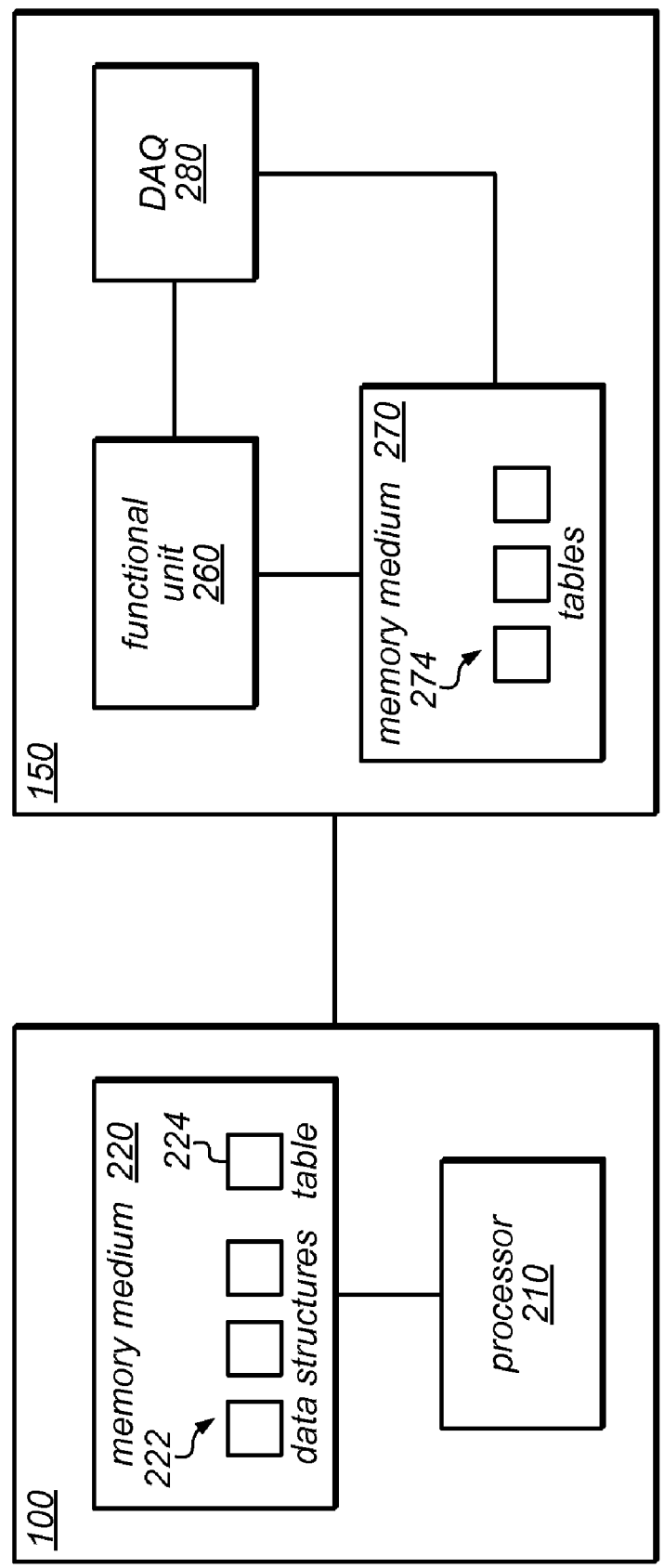
FIG. 2 is an exemplary block diagram of a host system and a client device according to one embodiment.

FIG. 2—Exemplary Block Diagram of a Host System and a Client Device

FIG. 2 depicts a block diagram of a host system 100 coupled to a client device 150 according to one embodiment.

As shown, the host 100 may include at least a processor 210 and a memory medium 220. The host may also include additional components, for example the host may be a computer system 100 as depicted in FIG. 1 and described above. The host 100 may additionally be coupled to one or more other devices in some embodiments, e.g. other client devices and/or other host systems.

The memory medium 220 of the host 100 may include one or more data structures 222 according to various embodiments. A data structure 222 as used herein may refer to a specific structure in which data may be stored, to which data may be written, and/or from which data may be read. For example, the data structure 222 may have four "slots", which may be divided into two pairs of slots. Thus each slot may be distinguishable, e.g., with a two-bit label designating the pair of slots and the slot within the pair of slots. Thus, the host 100 or the client 150 may be able to specify a specific slot within a given data structure 222 to write to or to read from, and may be able to maintain information relating to the reading or writing status of each slot of a given data structure 222. It should be noted that in some embodiments the four slots may not simultaneously contain useful data; rather, there may be four slots in each data structure 222 primarily for the purpose of ensuring that the communication mechanism is fully deterministic for asynchronous communication and that the data transferred is always fully coherent. Thus the host system 100 may only need the most recent data (e.g. in the most recently written data slot) in a given data structure 222 at any one time.

A data structure 222 may further include one or more "headers", which may indicate some specific information about the slots of the given data structure. For example, a data structure 222 might include "reading" information, indicating which pair of slots has been most recently read from. The memory medium on the host may also or alternatively include one or more tables 224 of information. For example, there may be a plurality of similar data structures 222 in the host's memory medium 220, and rather than storing the "reading" information for each data structure 222 as a header of that data structure, the "reading" information may all be stored in a single table 224, such that the "reading" information for a given data structure may be separate from but still associated with the given data structure 222. More detailed description of the information that may be stored on the host memory medium is provided below in the context of the various embodiments involved.

The client device 150 may include at least a functional unit 260 and a memory medium 270. As defined above, a functional unit 260 may include a processor and a memory medium, or may include a programmable hardware element, or may include a combination of such elements, which may be configurable to perform one or more embodiments of the present invention. In some embodiments, e.g. when the functional unit 260 is a processor and a memory medium, the memory medium of the functional unit and the memory medium 270 shown in FIG. 2 may be the same memory medium, e.g. there may only be one memory medium 270 on the client side. In addition, there may be one or more data acquisition (DAQ) cards 280 or other means of acquiring data on or coupled to the client device 150. The client device 150 may additionally be coupled to one or more other devices in some embodiments. Alternatively, the client device may be coupled only to the host system 100 and may not be configured to acquire data independently from the host 100.

The memory medium 270 on the client device 150 may include information corresponding to one or more data structures 222 on the host 100. In various embodiments, for example, the client memory medium 270 may include information for each data structure 222 on the host memory medium 220 indicating which pair of slots has been written to most recently, which slot of each pair has been written to most recently, and/or which pair of slots has been read from most recently. In some embodiments, the client memory medium 270 may include information indicating the potential validity or invalidity of some or all of the information corresponding to the one or more data structures on the host. More detailed description of the information that may be stored on the client memory medium is provided below in the context of the various embodiments involved.

The client 150 may be coupled to the host 100 such that data may be transferred in either direction, e.g. from the host 100 to the client 150 or from the client 150 to the host 100.

Figure 3:
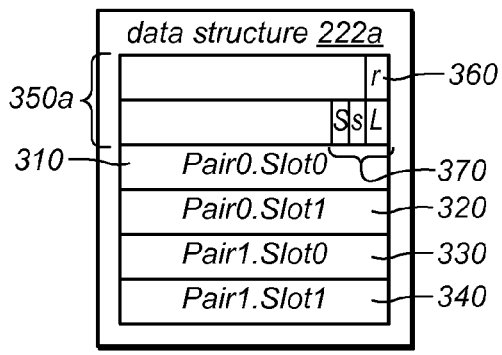
FIG. 3 depicts a representation of a data structure according to one embodiment.

FIG. 3—Data Structure on a Host System According to One Embodiment

FIG. 3 depicts a data structure 222A as might exist in the host memory 220 according to one embodiment. The data structure 222A pictured includes four slots 310, 320, 330, 340, each of which may be designated by a two bit address: the first pair, first slot may be (0,0) 310; the first pair, second slot may be (0,1) 320; the second pair, first slot may be (1,0) 330; and the second pair, second slot may be (1,1) 340. The data structure 222A pictured also includes a header 350A.

The header 350A in this embodiment includes "reading" information 360. "Reading" information 360 as used herein refers to information that indicates, for a given data structure, which pair of slots has been read from most recently, e.g., by the host system 100. The "reading" information may be stored as a single bit, e.g. a '0' for the first pair of slots or a '1' for the second pair of slots. It may also be possible to store the "reading" information 360 as more than one bit.

The header 350A in this embodiment also includes "latest" information 370. "Latest" information 370 as used herein refers to information that indicates, for a given data structure, which pair of slots has been written to most recently, which slot of the first pair of slots has been written to more recently, and which slot of the second pair of slots has been written to more recently, e.g., by the client 150. The "latest" information 370 may be stored as three bits, depicted in FIG. 3 as 'S', 's', and 'L'. For example, 'S' may indicate the slot of the first pair of slots that has been written to more recently; in this case if the 'S' bit read '0', it would indicate that the first slot of the first pair of slots 310 has been written to more recently. The 's' bit may similarly indicate which slot of the second pair of slots has been written to more recently. The 'L' bit may indicate which pair of slots has been written to most recently in a similar manner. Thus in this embodiment, if the 'L' bit reads '1' and the 's' bit reads '0', the "latest" information 370 may indicate that the first slot of the second pair of slots 330 has been written to most recently. Other ways of storing, labeling, and using the "latest" information 370 are also envisioned, for example the "latest" information 370 may include a different number of bits, and/or the meanings of bits reading '1' and '0' may be reversed, among other possibilities.

Various of the embodiments described below may also refer to "reading" information and "latest" information, such as are described with respect to this data structure. In general, although the way the information is stored may vary in the different embodiments, the meanings of "reading" information and "latest" information may be consistent throughout this section.

Figure 4:
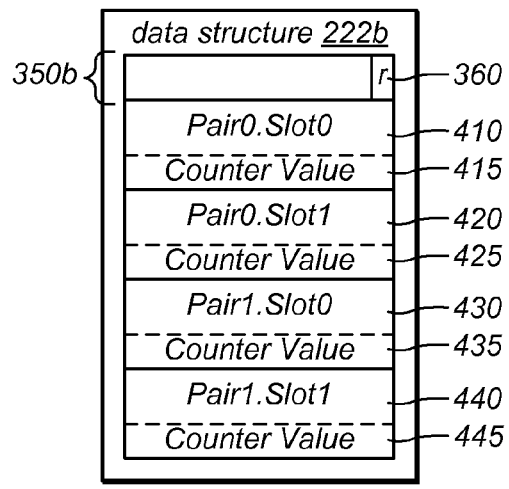
FIG. 4 depicts a representation of a data structure according to one embodiment.

FIG. 4—Data Structure on a Host System According to Another Embodiment

FIG. 4 depicts a data structure 222B according to another embodiment. In the data structure 222B of FIG. 4, there is a header 350B including "reading" information 360 as in the data structure 222A of FIG. 3. Similarly, there are four data slots 410, 420, 430, 440, which can be designated by two bit addresses in a similar manner to the data slots 310, 320, 330, 340 of FIG. 3. However, there is no "latest" information 360 in the header 350B in this embodiment. Instead, there is a portion of each data slot 415, 425, 435, 445 designated for a counter value (which could also be considered a timestamp). The portion of the data slot designated for a counter value 415, 425, 435, 445 may be the final portion, e.g. the final 32 bits, or the final 64 bits.

The counter values may be useable to indicate the "latest" information 370. In other words, by reading and comparing the counter values for each data slot, the host 100 may be able to determine which pair of slots has been written to most recently, and which slot of each pair of slots has been written to more recently. For example, a higher counter value may indicate a more recent write action. Thus in this example, the slot with the highest counter value would be the most recently written slot, and the pair of slots containing this slot would be the pair most recently written to. The slot with the higher counter value of the other pair of slots would be the slot more recently written to for that pair of slots. Other counting systems may also be possible, for example lower counter values may indicate more recent write actions; other embodiments are also envisioned.

It should be noted that in some embodiments the counter value may have to be located in the final portion of each data slot. For example, if the counter value is not located the final portion of the data slot, e.g., if the counter value is in another portion of the data slot, such as the first portion or somewhere in the middle of the data slot, this could result in data coherency problems. That is to say, if a data slot were to contain data after the counter value, the host could read a newly written counter value in a data slot, determine that the slot containing the newly written counter value is the most recently written to slot, and read the data in that data slot, all before that data slot (e.g., the portion of the data slot after the counter value) had been fully written. This could therefore result in the host reading incoherent data; thus, data coherency requirements may necessitate that the counter value be the last portion written to in any write operation including a counter value.

FIGS. 5A-5D—Counter Values According to Various Embodiments

According to some embodiments, the counter value may be the last 64 bits of each data slot. These 64 bits may be written as two 32 bit words. Thus in some embodiments it may be important to ensure that even if the host 100 reads the counter values to determine the location of the most recently written data while the client 150 is writing a new counter value to the data slot which it has just written, the host will still read data which is coherent and which is the most recently fully written data. If the counter value is written in little-endian format, this is assured. FIGS. 5A-5D illustrate the various cases. In each figure, the "Last Frame" 702 refers to a counter value previous to the write. "New Frame (intermediate)" 704 refers to a counter value after the second word of the counter has been updated and before the first word of the counter has been updated. "New Frame (final)" 706 refers to a new counter value in its entirety such as it would read after the client is finished writing to that slot.

Figure 5A:
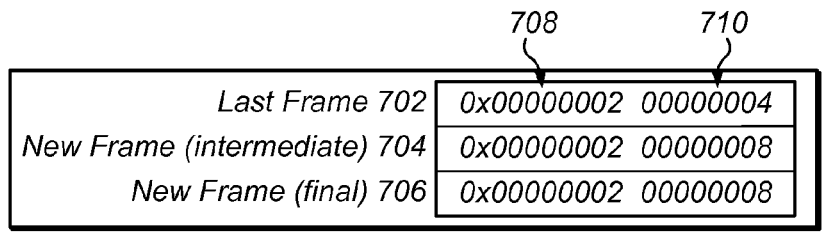
FIGS. 5A, 5B, 5C, and 5D depict representations of counter values according to various embodiments.

FIG. 5A depicts the case where the first word 708 of the counter is the same in both the previous counter value 702 and the new counter value 706. In this case, the counter would correctly indicate that the written-to slot was the most recently written slot if read at the intermediate stage 704.

Figure 5B:
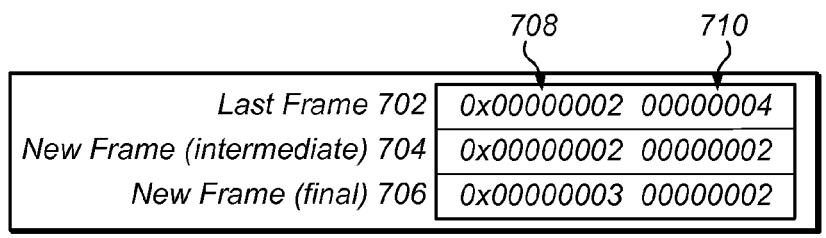

FIG. 5B depicts the case where the first word 708 of the counter is higher in the new counter value 706 than in the old counter value 702, and the second word 710 of the counter is lower in the new counter value 706 than in the old counter value 702. Thus the intermediate stage 704 reads as an older value. If the host 100 reads the counter value at this point it will consider the next-most-recently written slot as the most recently written slot. In fact this is correct since the write is not considered complete until the entire slot (including the counter value) is transferred, so logically, the host would not read old data, but would read the most recent fully complete data.

Figure 5C:
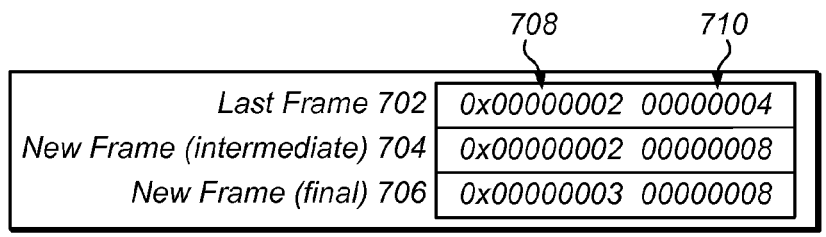

FIG. 5C depicts the case where both the first word 708 of the counter and the second word 710 of the counter are higher in the new counter value 706 than in the old counter value 702. Thus the intermediate stage 704 reads as a newer value, although not the fully correct new value. If the host 100 reads the counter value at this point it may consider this the most recently written slot, in which case it will read the new data, which is fully coherent. Alternatively the host may consider the next-most-recently written slot as the most recently written slot (if, for example, the next-most-recently-written slot has a counter value in between the intermediate value of this slot and the new counter value of this slot). In this case, as in 5B, the host 100 would read the most recent fully complete data, which is also coherent.

Figure 5D:
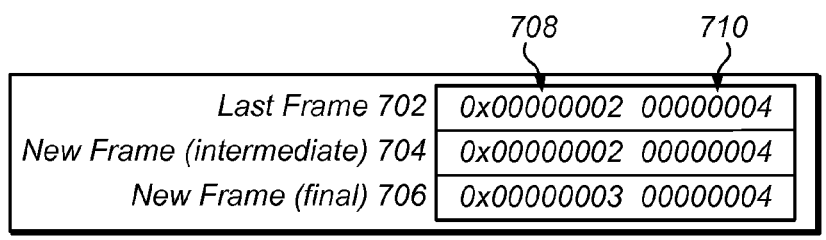

FIG. 5D depicts the case where the first word 708 of the counter is higher in the new counter value 706 than in the old counter value 702, and the second word 710 of the counter is the same in the new counter value 706 as in the old counter value 702. In this case the intermediate stage 704 will read as the old counter value 702. If the host reads the counter value at this point it will consider the next-most-recently written slot as the most recently written slot, and again as in 5B, will read the most recent fully complete data, which is fully coherent.

It should be noted that in some embodiments, for example in which data is written by a client device 150 frequently, and the counter is relatively small, e.g. 32 bits, an overflow condition could periodically occur, leading to older data being read. However, a 64 bit counter, for example, is unlikely to have this problem. A 64 bit count could be incremented 18,446,744,073,709,551,615 times before overflowing. Even if a client device 150 writes every 1 μs, this would allow at least 584,000 years before the overflow condition is reached.

FIG. 6—A Plurality of Data Structures and a Table stored in a Host Memory FIG. 6 depicts a plurality of data structures 222C which may be stored in the host memory 220 along with a table 224 which may be stored in the host memory 220 according to one embodiment. There may be any number of data structures in the host memory, e.g., there may be N data structures, where N may be 10, 100, 1000, or any number. The data structures 222C may be similar, though in some embodiments not identical, to the data structure 222A depicted in FIG. 3; they each may include four data slots 310, 320, 330, 340 which may be designated by two bit addresses, and they each may include a header 350C with "latest" information 370.

The data structures 222C may not each include "reading" information 360 in the header 350C. Instead, there may be a separate host reading table 224 which stores the "reading" information 360 for all of the data structures 222C. The "reading" information 360 for each data structure 222C may be stored as a single bit and indicate which pair of slots has been read from most recently just as described with relation to FIG. 3. The "reading" information 360 for all of the data structures 222C may simply be stored as a single separate table 224 instead of each data structure's "reading" information 360 being included individually in the header 350C of each data structure 222C.

FIG. 7—A Plurality of Data Structures and a Table Stored in a Host Memory FIG. 7 depicts a plurality of data structures 222D which may be stored in the host memory 220 along with a table 224 which may be stored in the host memory 220 according to another embodiment. There may be any number of data structures in the host memory, e.g., there may be N data structures, where N may be 10, 100, 1000, or any number. The data structures may each include four data slots 410, 420, 430, 440 which may be designated by two bit addresses, as described above with relation to the data structures of FIGS. 3, 4, and 6. As with the data structure 222B depicted in FIG. 4, each data slot may include a portion designated for a counter value 415, 425, 435, 445. The designated portion 415, 425, 435, 445 may be the final portion of each slot, e.g. the final 64 bits of each slot. The counter values for each data structure may function in all respects as those described above with respect to FIG. 4, e.g. they may be useable to indicate the "latest" information 370. The data structures 222D may not include any headers.

The table may be a host reading table 224. The host reading table 224 may function in a similar manner to the host reading table 224 depicted in FIG. 6 and described above, e.g. may include the "reading" information 360 for each data structure 222D included in the host memory 220 all in a single separate table 224.

Figure 8:
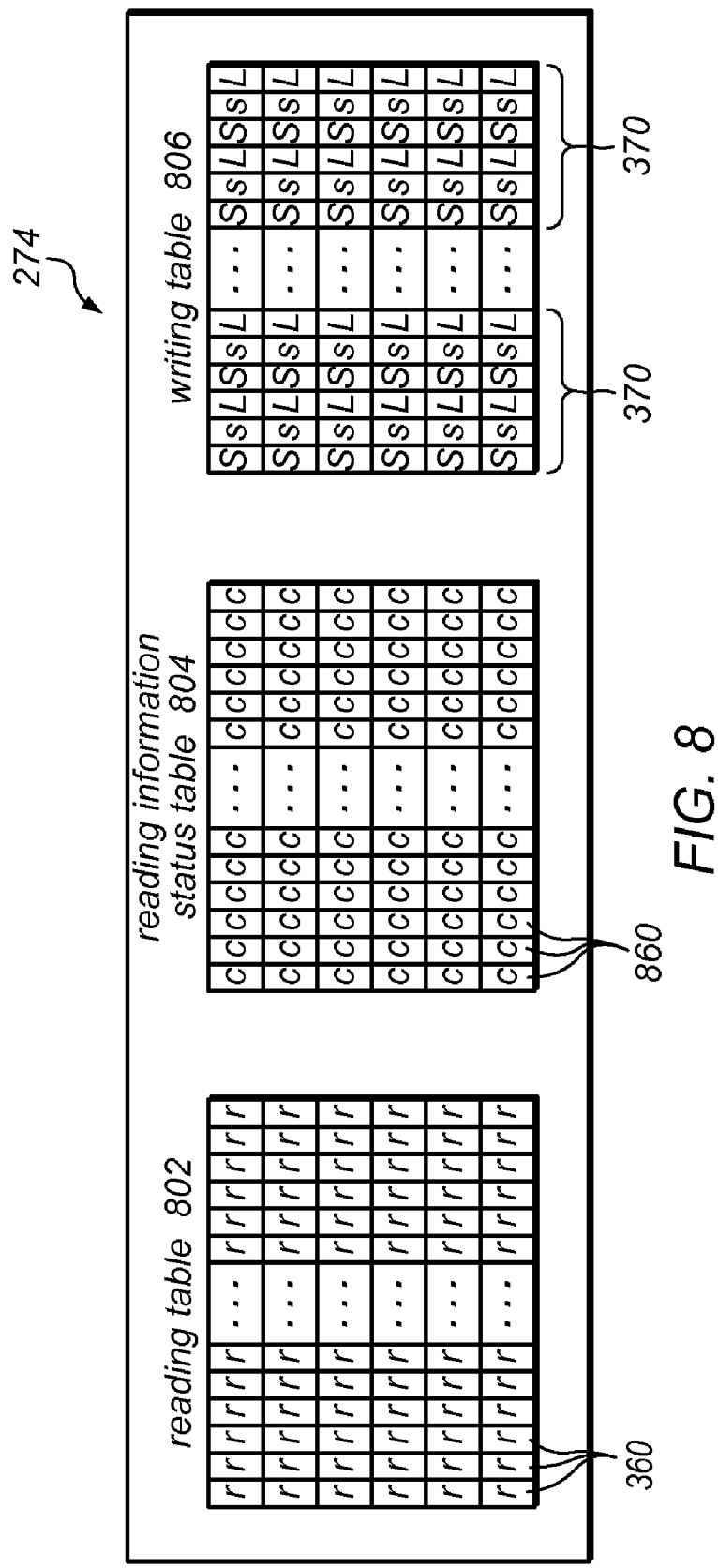
FIG. 8 depicts a representation of a plurality of tables as might be stored in a client memory according to one embodiment.

FIG. 8—A Plurality of Tables Stored in a Client Memory

FIG. 8 depicts a plurality of tables 274 as might be stored in the client memory 270 according to one embodiment. One or all of these tables may be stored in the client memory 270 according to various embodiments.

There may be a reading table 802. The reading table 802 may correspond to a host reading table 224 in the host memory 220, for example the host reading table 224 of FIG. 6 or FIG. 7. The reading table 802 in client memory 270 may be a copy of the host reading table 224 in the host memory 220, e.g. the information in the reading table 802 may be obtained or updated only by retrieving that information from the host. The reading table 802 may contain "reading" information 360 for each of a plurality of data structures in the host memory 220.

There may be a reading information status table 804. The reading information status table 804 may include "reading information status" information 860 for each data structure 222 of the plurality of data structures 222 in the host memory 220. "Reading information status" information 860 may indicate, for a given data structure 222 in the host memory 220, whether that data structure 222 has been written to since the reading table 802 was most recently updated. In other words, the "reading information status" information 860 for a given data structure 222 provides an indication that the "reading" information 360 in the reading table 802 for that data structure 222 is valid (e.g., if the data structure 222 has not been written to since the reading table 802 was most recently updated), or alternatively, provides an indication that the "reading" information 360 in the reading table 802 may not be valid (e.g., if the data structure 222 has been written to since the reading table 802 was most recently updated). Since the "reading" information 360 originates from the host 100, including this "reading information status" information on the client 150 may allow the client 150 to update the "reading" information 360 (e.g., perform a read operation) from the host 100 less frequently than without the "reading information status" information 860.

There may be a writing table 806. The writing table 806 may include "latest" information 370 for each data structure 222 in the host memory 220. The "latest" information 370 for each data structure 222 may indicate which pair of slots has been written to most recently, and which slot of each pair of slots has been written to more recently. The "latest" information 370 for each data structure 222 may include three bits, or another number of bits.

Figure 9:
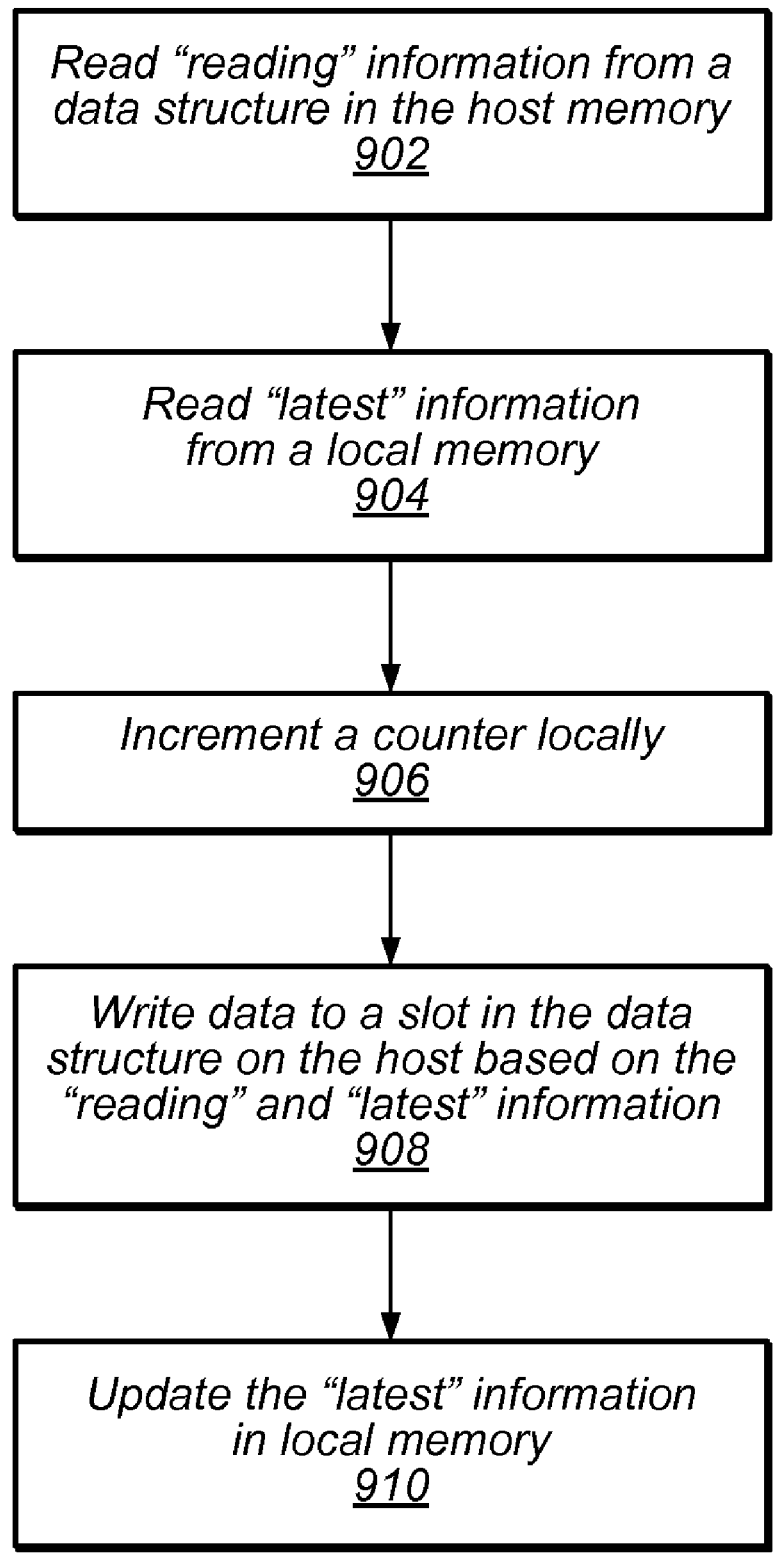
FIG. 9 is a flowchart diagram illustrating a method for a client to transfer data to a host according to one embodiment.

FIG. 9—Flowchart Diagram of a Method for a Client Device to Transfer Data to a Host FIG. 9 is a flowchart diagram of a method for a client device to transfer data to a host according to one embodiment. The method of FIG. 9 is intended to provide an increase in throughput of an asynchronous data transfer in a four slot communication mechanism over the prior art. The prior art requires three DMA operations for each data transfer (one read and two writes). In the method of FIG. 9, the two write steps are essentially combined. That is to say, instead of a separate write to a header in a data structure to provide the host with "latest" information, the method adds a counter value to the actual data written to each data slot. The counter values are useable by the host to obtain equivalent "latest" information without requiring an additional DMA write operation.

The method depicted in FIG. 9 and described below may be performed in conjunction with one or more of the systems described above and depicted in FIGS. 1 and 2. The steps of the method may be as follows.

In 902, the client device 150 may read "reading" information 360 from a data structure 222 in the host memory 220. The data structure 222 in the host memory 220 may preferably be the data structure 222B depicted in FIG. 4 and described above. Thus the "reading" information 360 may indicate which pair of slots has been read from by the host most recently.

In 904, the client device 150 may read "latest" information 370 from a local memory 270. The local memory 270 may include a writing table 806 such as the one depicted in FIG. 8. Thus the "latest" information 370 may indicate which slot of the most recently read from pair of slots has been written to most recently. Other ways of storing "latest" information in addition to or instead of a writing table are also envisioned.

In 906, the client device 150 may increment a counter locally. The counter may be stored in a local memory 270 or may be comprised in a programmable hardware element; other ways of storing the counter may also be possible. In some embodiments, the client device 150 may include one counter for all of the (one or more) data structures 222B in the host memory 220. In this case the client 150 may increment the counter before every write, e.g. before the client 150 writes to any data structure 222B in the host memory 220. Alternatively, there may be a counter in the client memory 270 for each data structure 222B in the host memory 220, and the client 150 may increment the counter only before writes to the particular data structure 222B associated with that counter. In general, the counter may be used to mark the relative order in which the slots of a data structure have been written. For example, the first slot written may have a counter value of 1. The second slot may have a counter value of 2. The third slot written may have a counter value of 3. The counter values may continue to increment sequentially with each write, thus in one example, the counter values of the slots might read 17 and 21 for the first pair, and 20 and 22 for the second pair. In this example, the second slot of the first pair has been written to more recently of the first pair, the second slot of the second pair has been written to more recently of the second pair, and the second pair has been written to most recently. Thus, the counter values may be usable to indicate which pair has been written to most recently and which slot of each pair has been written to more recently.

In 908, the client device 150 may write data to a slot in the data structure 222B in the host memory 220 based on the "reading" 360 and "latest" information 370. The slot may be the slot which has not been written to more recently of the pair of slots that has not been read from most recently. In other words, the client 150 may first determine which pair of slots the host 100 may be reading from. In order to avoid overwriting data while it is being read (which could lead to the host 100 reading incoherent data), the client 150 may choose to avoid the pair of slots which the host 100 has read from most recently. Then, the client 150 may determine which slot of the remaining pair of slots has been written to most recently. In case the host 100 finishes reading from the other pair of slots and reads the more-recently-written slot of this pair of slots before the client 150 finishes writing, the client 150 may choose to avoid the more-recently-written slot of this pair of slots. Thus, the client 150 may write to the slot which contains the oldest data in the pair of slots not currently being read from by the host 100. The data may include measurement data, for example, data collected by the client device, e.g., using a DAQ card or other means of data acquisition. The data may be another kind of data instead of measurement data, or may include measurement data and other data. The data written to the slot may include the value of the counter, for example, the counter size may be set as 64 bits, and the last 64 bits of the data written may be the value of the counter.

In 910, the client device 150 may update the "latest" information 370 in the local memory 270. The client 150 may update the "latest" information 370 to indicate that the slot which has just been written to is the most-recently-written-to slot, and the pair including that slot is the pair of slots which has been written to most recently. This may be necessary so that the client 150 has the correct information the next time the client wants to transfer data.

Figure 10A:
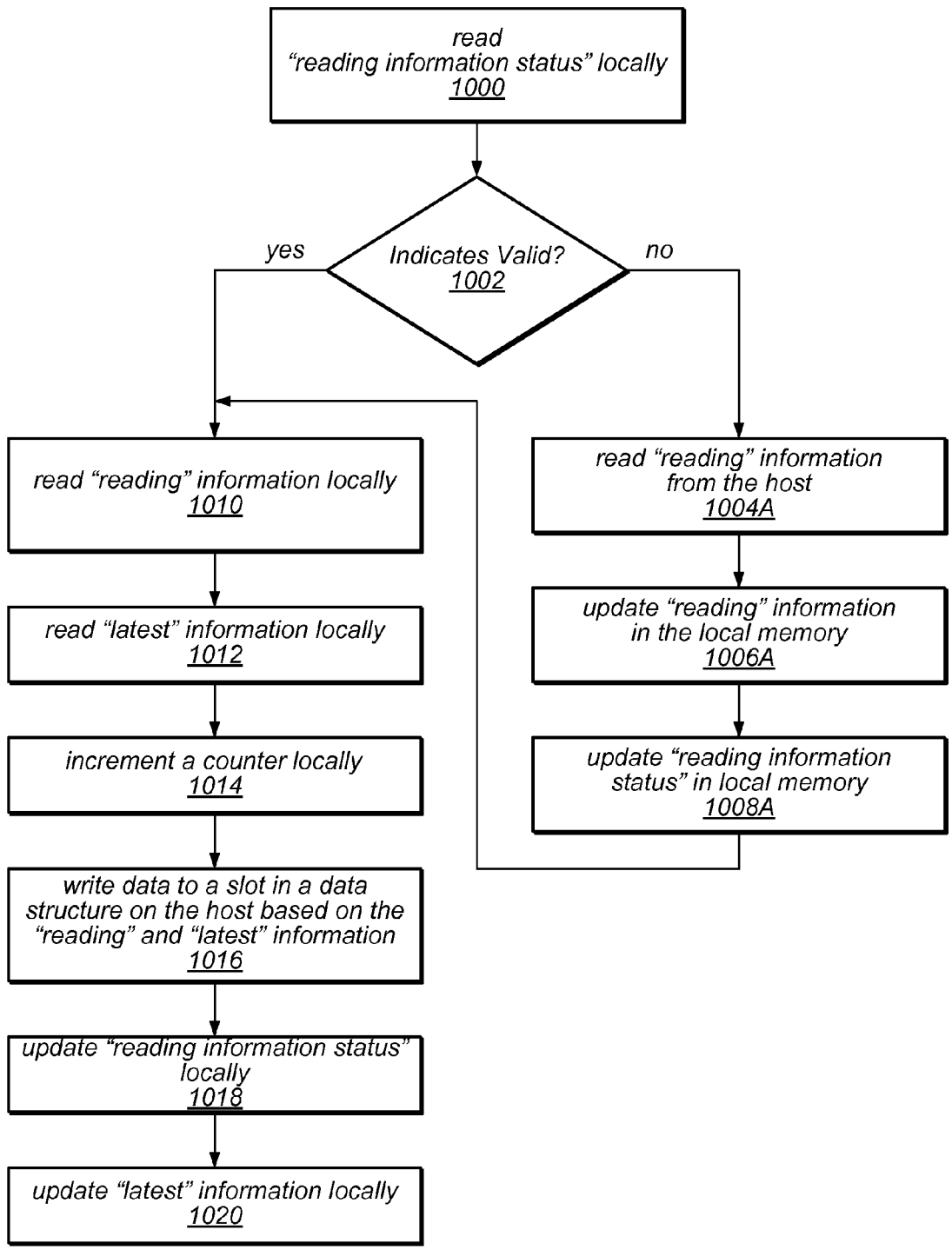
Figure 10B:
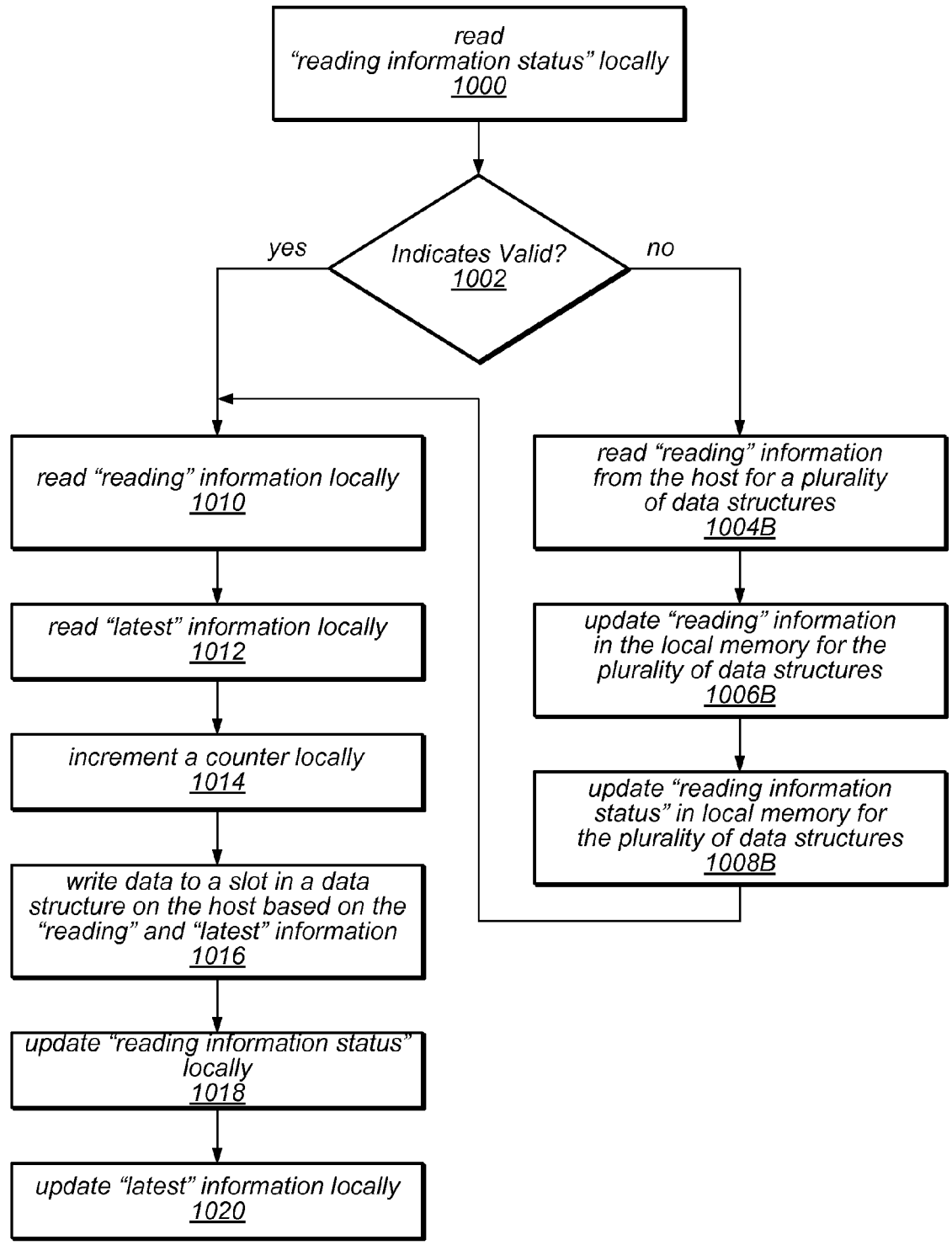

FIGS. 10A-10B—Flowchart Diagrams of Alternate Embodiments of a Method for a Client Device to Transfer Data to a Host System FIGS. 10A and 10B depict flowchart diagrams illustrating alternate embodiments of a method for a client device to transfer data to a host system. The methods of 10A and 10B are primarily intended to decrease the overall latency of an asynchronous data transfer utilizing a four slot communication mechanism. The method depicted in FIG. 10B illustrates embodiments of a system where a host has a plurality of data structures in a host memory in which it is possible to receive data from a client device. The client may hold similar data (e.g., "reading" information) for all of the data structures in the host memory in one or more tables in the client's own memory. As long as the data in the client's memory is accurate (e.g., identical to the "reading" information set by the host and stored in the host memory), the client can use this information to determine a write location without requiring a DMA read operation to get this information from the host. The method thus includes "reading information status" information in the client memory to ensure the accuracy of the local "reading" information. In the ideal circumstances, this may allow the client to read the "reading" information for the entire plurality of data structures in the host memory once, by performing a single DMA read, then write to each of the plurality of data structures in turn without requiring another DMA read until all of the plurality of data structures have been written to. Said another way, if there were 300 data structures in the host memory, under ideal conditions this method would make one DMA read operation over the course of 300 data transfers (one transfer to each of 300 data structures), as compared to the prior art solution which would require 300 DMA read operations for 300 data transfers (i.e. a DMA read for every data transfer).

The method depicted in 10A illustrates essentially the same method as 10B, but for a host memory containing only a single data structure. In this system the method would still require a DMA read for every data transfer and thus its usefulness may be reduced; however, such a system may be unlikely to occur in reality, but for explanation, it has been included.

The method depicted in FIGS. 10A and 10B and described below may be performed in conjunction with one or more of the systems described above and depicted in FIGS. 1 and 2. The steps of the methods may be as follows.

In 1000, a client 150 may read "reading information status" information 860 from a local memory 270 for a data structure 222 in a host memory 220. The data structure 222 may preferably be either the data structure 222C of FIG. 6 or the data structure 222D of FIG. 7 in various embodiments. The "reading information status" information 860 may indicate that the "reading" information 360 stored in a reading table 802 in local memory 270 either is valid or may not be valid for the data structure 222.

As shown in step 1002, if the "reading information status" information 860 indicates that the "reading" information 360 is valid, the method may continue to step 1010, potentially skipping steps 1004A, 1006A, and 1008A or 1004B, 1006B, and 1008B and thereby eliminating a DMA read operation. If the "reading information status" information 860 indicates that the "reading" information 360 may not be valid, the method may continue to step 1004A or 1004B.

In 1004A the client 150 may read "reading" information 360 from the host memory 220 for the data structure 222 in the host memory 220. The "reading" information 360 in the host memory 220 may be stored in a host reading table 224. Alternatively, in 1004B, the client 150 may read "reading" information 360 from the host memory 220 for a plurality of data structures 222 in the host memory 220. For example, the client 150 may read the entire reading table 224 from the host memory 220.

In 1006A the client 150 may update the "reading" information 360 in the local memory 270 for the data structure 222. For example the client 150 may update a "reading" bit for the data structure 222 in a reading table 802 in local memory 270 to match the corresponding "reading" bit in the host reading table 224 in host memory 220. Alternatively, in 1006B, the client 150 may update the "reading" information 360 in local memory 270 for a plurality of data structures 222 in host memory 220. For example, the client 150 may update an entire reading table 802 in local memory 270 to match the entire host reading table 224 in host memory 220.

In 1008A the client 150 may update the "reading information status" information 860 in local memory 270 for the data structure 222. For example the client 150 may update a "reading information status" bit for the data structure 222 to indicate that the "reading" information 360 in local memory 270 for that data structure 222 is valid, e.g. that the data structure 222 has not been written to since the "reading" information 360 in local memory 270 has been most recently updated. Alternatively, in 1008B, the client 150 may update the "reading information status" information 860 for a plurality of data structures 222 in the host memory 220, for example, the client 150 may update an entire reading information status table 804 in local memory 270 to indicate that the "reading" information 360 for each of the plurality of data structures 222 is valid.

After step 1008A or 1008B, the "reading information status" information 860 may indicate that the "reading" information 360 for that data structure 222 is valid. The condition for step 1010 may thus be met and the method may therefore continue with step 1010.

In step 1010, the client 150 may read "reading" information 360 in local memory 270 for the data structure 222 in the host memory 220. The "reading" information 360 may be stored in a reading table 802 in the local memory 270, e.g. along with "reading" information 360 for a plurality of other data structures 222 in the host memory 220. The "reading" information 360 for that data structure may indicate which pair of slots has been read from most recently.

In step 1012, the client 150 may read "latest" information 370 in local memory 270 for the data structure 222 in the host memory 220. The "latest" information 370 may be stored in a writing table 806 in the local memory 270, e.g. along with "latest" information 370 for a plurality of other data structures 222 in the host memory 220. The "latest" information 370 for that data structure may indicate which slot of each pair of slots has been written to most recently.

In 1014, the client 150 may increment a counter locally. The counter may be similar or identical to any of the above described counters. The counter may be incremented to a latest value. Alternatively, in some embodiments there may not be a counter on the client 150, and this step may be skipped.

In 1016, the client 150 may write data to a slot in the data structure 222 in the host memory 220 based on the "reading" information 360 and the "latest" information 370. The slot may be the slot which has not been written to most recently of the pair of slots that has not been read from most recently. The data may include measurement data, for example, data collected by the client device 150, e.g., using a DAQ card or other means of data acquisition. The data may be another kind of data instead of measurement data, or may include measurement data and other data. The data may include the latest value of the counter, thus effectively including a form of "latest" information 370 in the data structure for the host to use. The value of the counter may be written as the last portion of the data, for example, the size of the counter value may be set as 64 bits, and the last 64 bits of the data may be the value of the counter.

In 1018, the client 150 may update the "reading information status" information 860 in local memory 270. This may include updating a "reading information status" bit in a reading information status table 804 to indicate that the data structure 222 has been written to since the "reading" information 360 in the local memory 270 (e.g. in a reading table 802) has been most recently updated. In this way, the client 150 may ensure that the client 150 will update its "reading" information 360 the next time it wants to transfer data to that data structure, if it hasn't done so in the course of transferring data to another data structure before then.

In 1020, the client 150 may update the "latest" information 370 in local memory 270. This may include updating the "latest" bits in a writing table 806 to reflect the location of the write operation just performed.

In some embodiments, e.g., where there is no counter and the data written does not include a latest counter value, there may be an additional DMA write operation required, e.g. to write the "latest" information 370 to a header of the data structure, for example if the data structure 222 is the data structure 222C of FIG. 6.

Various embodiments of data structures, tables, and methods for a client to transfer data to a host have been presented. It should be noted that an optimal embodiment may include a transfer according to the method of FIG. 10B into a host memory as shown in FIG. 7, supported by the tables shown in FIG. 8 in the client memory. This may combine the throughput increase provided by utilizing a counter (thereby eliminating a DMA write operation) with the latency decrease provided by storing a copy of the "reading" information for a plurality of data structures in the client memory (thereby eliminating a DMA read operation under normal conditions). In this case, where the host has a plurality of data structures, a best case scenario would allow most data transfers from the client to require only a single DMA write. That is, the initial DMA read and the final DMA write required by the prior art may be unnecessary in this system for most data transfers. As a large portion of the time associated with asynchronous data transfer is often overhead associated with each DMA operation, cutting out two of the three DMA steps, although it may in some embodiments introduce additional overhead for the remaining DMA step, may result in a significant increase in throughput and decrease in latency over the prior art.

Figure 11:
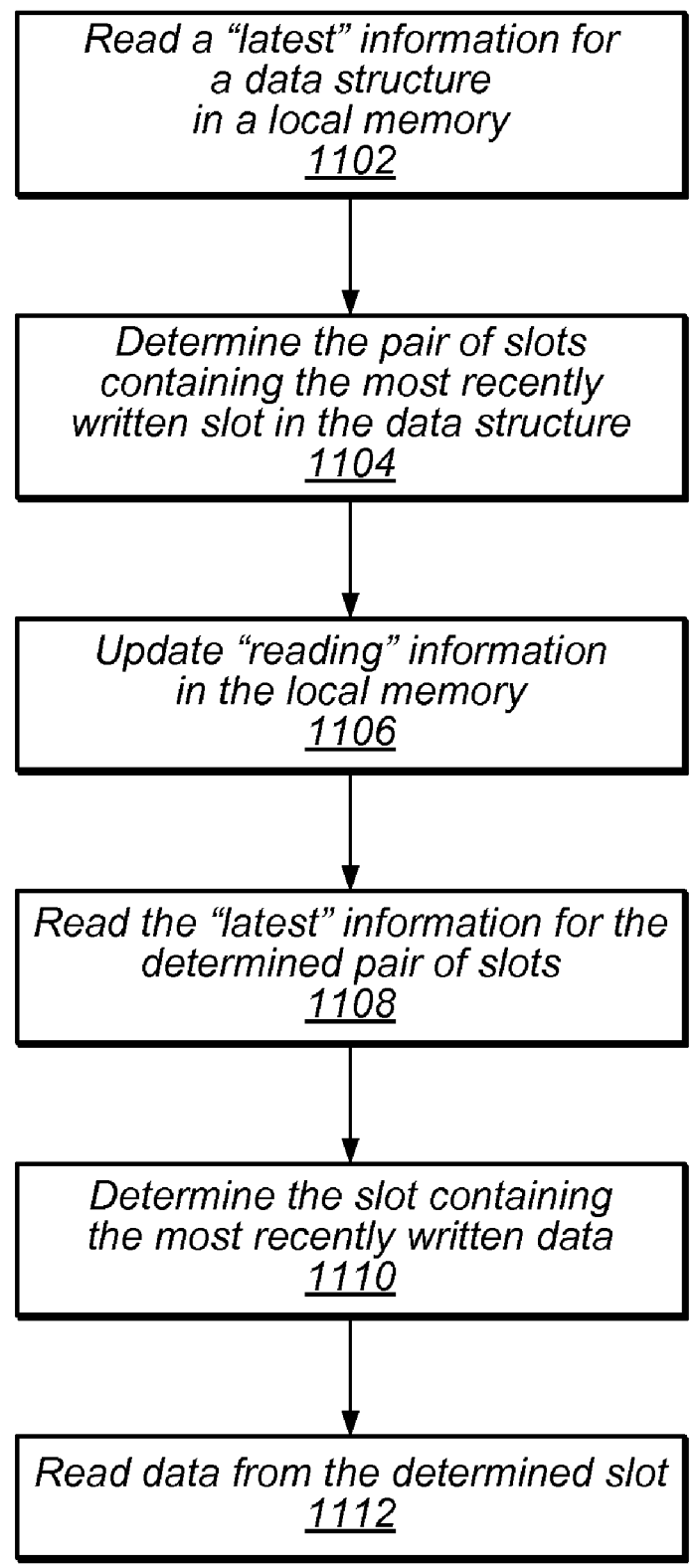
FIG. 11 depicts a flowchart diagram illustrating a method for a host to determine a location of most recently transferred data according to one embodiment.

FIG. 11—Method for a Host to Determine a Location of Most Recently Transferred Data FIG. 11 depicts a flowchart diagram illustrating a method for a host to determine a location of most recently transferred data according to various embodiments. Embodiments of the method may be used in association with one or more of the methods described above for a client to transfer data to a host; for example the most recently transferred data whose location the host determines in this method may have been transferred to the host according to one of the methods for a client device to transfer data to a host system.

The method depicted in FIG. 11 and described below may be performed in conjunction with one or more of the systems described above and depicted in FIGS. 1 and 2. The steps of the methods may be as follows.

In 1102 a host 100 may read "latest" information of a data structure 222 in a local memory 220. The data structure 222 may be a four slot data structure 222 and may or may not include a header, which may include "reading" and/or "latest" information as variously previously described according to different embodiments. In one embodiment the "latest" information for the data structure may be included as a counter value for each slot of that data structure. The counter value for each slot may provide an indication of how recently the data was written, for example, a slot with a highest counter value may have been written to most recently. Alternatively the data structure 222 may include a header including "latest" information 370 and the host 100 may read the "latest" information 370 from the header In this case the data structure 222 may not include counter values for each slot of the data structure.

In 1104 the host 100 may determine the pair of slots containing the most recently written slot of in the data structure 222. The host 100 may make this determination based on having read the counter value for each slot; for example, the host 100 may determine that the pair of slots containing the slot with the highest counter value may have been written to most recently. Alternatively, if the data structure includes a header including "latest" information 370 and the host 100 reads the "latest" information 370 instead of the counter values for each slot, the host 100 may make the determination of the pair of slots based on the "latest" information 370 read from the header of the data structure 222.

In 1106 the host 100 may update "reading" information 360 in the host memory 220. The "reading" information 360 may be in a header in the data structure 222 as in the data structure 222B of FIG. 4. Alternatively the "reading" information 360 may be in a table such as the host reading table 224 of FIG. 7. The host 100 may update the "reading" information 360 to indicate that it is reading from the pair determined to contain the most recently written data. The host may need to update the "reading" information 360 in order to ensure full coherence, e.g., to ensure that the client device 150 doesn't write over the slot from which the host 100 will read while the host is reading from that slot.

In 1108 the host 100 may read the "latest" information for the determined pair of slots. This may include reading the counter value for each slot in the determined pair of slots. Although the host 100 may have already read the counter values for each slot, it may be necessary to read the counter values of the determined pair again after updating the "reading" information 360 to ensure the data coherency of the data to be read and to avoid any potential problems such as race conditions with the client 150 that might otherwise develop if the host 100 simply used the previously read counter values. Alternatively, as noted above, the data structure 222 may include a header including "latest" information 270 and the host 100 may read the "latest" information 270 from the header instead of reading the counter values for each slot. Again, in this embodiment, there may not be counter values for each slot of the data structure.

In 1110 the host 100 may determine the slot containing the most recently written data. The host 100 may make this determination based on the counter values read after updating the "reading" information 360, e.g. the counter values read in step 1108. As noted, this may help ensure data coherency and avoid race conditions with the client 150 as it performs any write operations. The determined slot may be the slot which has been written to most recently, as indicated by the counter value for that slot. Again, alternatively, if the data structure 222 includes a header including "latest" information 370 and the host 100 reads the "latest" information 370 instead of the counter values for each slot, the host 100 may make the determination of the slot based on the "latest" information 370 read from the header of the data structure 222.

In 1112 the host 100 may read data from the determined slot. The data itself may be measurement data, instrument data, or generally any kind of data where only the most recent set of data need be available to the host system 100. The data may include data in addition to the counter value, that is, the counter value may not be the only data read by the host.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method of transferring data from a client device to a host system, comprising:
   the client reading a first one or more bits from a data structure on the host, wherein the data structure comprises a first pair of slots, a second pair of slots and the first one or more bits, and wherein the first one or more bits indicate that the first pair of slots has been read from most recently by the host;
   the client reading a second one or more bits from a local memory, wherein the second one or more bits indicate that a first slot of the second pair of slots has been written to more recently;
   the client incrementing a value of a locally stored counter to a latest value, wherein the latest value of the locally stored counter is useable to indicate which slot has most recently been written to;
   the client writing first data to a second slot of the second pair of slots, wherein the client writes the data to the second slot of the second pair of slots based on the first one or more bits indicating that the first pair of slots has been read from most recently by the host and the second one or more bits indicating that the first slot of the second pair of slots has been written to more recently;
   wherein the first data includes the latest value of the locally stored counter;
   the client updating the second one or more bits in the local memory to indicate that the second slot of the second pair of slots has been written to more recently.

2. The method of claim 1, wherein the latest value of the locally stored counter is the last portion of the first data.

3. The method of claim 1, wherein the second one or more bits also indicate that a first slot of the first pair of slots has been written to more recently.

4. The method of claim 1, further comprising:
   the client reading the first one or more bits from the data structure on the host indicating that the first pair of slots has been read from most recently by the host
   the client reading the second one or more bits from local memory indicating that the second slot of the second pair of slots has been written to more recently;
   the client incrementing the locally stored counter to a new latest value;
   the client writing second data to the first slot of the second pair of slots, wherein the client writes the second data to the first slot of the second pair of slots based on the first one or more bits indicating that the first pair of slots has been read from most recently by the host and the second one or more bits indicating that the second slot of the second pair of slots has been written to more recently;
   wherein the second data includes the new latest value of the locally stored counter;
   the client updating the second one or more bits in the local memory to indicate that the first slot of the second pair of slots has been written to more recently.

5. The method of claim 1, further comprising
   the client reading the first one or more bits from the data structure on the host, wherein the first one or more bits have been updated by the host to indicate that the second pair of slots has been read from most recently by the host;
   the client reading the second one or more bits from the local memory, wherein the second one or more bits indicate that a first slot of the first pair of slots has been written to more recently;
   the client incrementing the locally stored counter to a new latest value;
   the client writing second data to a second slot of the first pair of slots, wherein the client writes the second data to the second slot of the first pair of slots based on the first one or more bits indicating that the second pair of slots has been read from most recently by the host and the second one or more bits indicating that the first slot of the first pair of slots has been written to more recently;
   wherein the second data includes the new latest value of the locally stored counter;
   the client updating the second one or more bits in the local memory to indicate that the second slot of the first pair of slots has been written to more recently.

6. A computer-accessible memory medium storing program instructions executable to:
   read a first one or more bits from a data structure on a host, wherein the data structure comprises a first pair of slots, a second pair of slots and the first one or more bits, and wherein the first one or more bits indicate that the first pair of slots has been read from most recently by the host;
   wherein the memory medium stores a second one or more bits that indicate that a first slot of the second pair of slots has been written to more recently;
   read the second one or more bits;
   increment a value of a counter to a latest value, wherein the value of the counter is useable to indicate which slot has been written to most recently;
   write first data to a second slot of the second pair of slots based on the first one or more bits indicating that the first pair of slots has been read from most recently by the host and the second one or more bits indicating that the first slot of the second pair of slots has been written to more recently;
   wherein the first data includes the latest value of the counter;
   update the second one or more bits to indicate that the second slot of the second pair of slots has been written to more recently.

7. The memory medium of claim 6, wherein the counter is stored on the memory medium.

8. The memory medium of claim 6, wherein the value of the counter is the last portion of the first data.

9. The memory medium of claim 6, wherein the program instructions are further executable to:
   read the first one or more bits from the data structure on the host indicating that the first pair of slots has been read from most recently by the host;
   read the second one or more bits indicating that the second slot of the second pair of slots has been written to more recently;
   increment the counter to a new latest value;
   write second data to the first slot of the second pair of slots based on the first one or more bits indicating that the first pair of slots has been read from most recently by the host and the second one or more bits indicating that the second slot of the second pair of slots has been written to more recently;
   wherein the second data includes the new latest value of the counter;
   update the second one or more bits to indicate that the first slot of the second pair of slots has been written to more recently.

10. The memory medium of claim 6, wherein the program instructions are further executable to:
    read the first one or more bits from the data structure on the host, wherein the first one or more bits have been updated by the host to indicate that the second pair of slots has been read from most recently by the host;
read the second one or more bits, wherein the second one or more bits indicate that a first slot of the first pair of slots has been written to more recently;
increment the value of the counter to a new latest value;
write second data to a second slot of the first pair of slots based on the first one or more bits indicating that the second pair of slots has been read from most recently by the host and the second one or more bits indicating that the first slot of the first pair of slots has been written to more recently;
wherein the second data includes the new latest value of the counter;
update the second one or more bits to indicate that the second slot of the first pair of slots has been written to more recently.

11. A client device which transfers data to a remote host, the client device comprising:
a memory medium;
a functional unit coupled to the memory medium, configured to:
read a first one or more bits from a data structure on the remote host, wherein the data structure comprises a first pair of slots, a second pair of slots and the first one or more bits, and wherein the first one or more bits indicate that the first pair of slots has been read from most recently by the host;
read a second one or more bits from the memory medium, wherein the second one or more bits indicate that the first slot of the second pair of slots has been written to more recently;
increment a value of a counter to a latest value, wherein the counter is stored on the memory medium and the value of the counter is useable to indicate which slot has most recently been written to;
write first data to a second slot of the second pair of slots based on the first one or more bits indicating that the first pair of slots has been read from most recently by the host and the second one or more bits indicating that the first slot of the second pair of slots has been written to more recently, wherein the first data includes the latest value of the counter;
update the second one or more bits on the memory medium after writing to the second slot of the second pair of slots to indicate that the second slot of the second pair of slots has been written to more recently.

12. The client device of claim 11, wherein the value of the counter is the last portion of the first data.

13. The client device of claim 11, wherein the functional unit is further configured to:
read the first one or more bits from the data structure on the host indicating that the first pair of slots has been read from most recently by the host;
read the second one or more bits indicating that the second slot of the second pair of slots has been written to more recently;
increment the counter to a new latest value;
write second data to the first slot of the second pair of slots based on the first one or more bits indicating that the first pair of slots has been read from most recently by the host and the second one or more bits indicating that the second slot of the second pair of slots has been written to more recently, wherein the second data includes the new latest value of the counter;
update the second one or more bits to indicate that the first slot of the second pair of slots has been written to more recently.

14. The client device of claim 11, wherein the functional unit is further configured to:
read the first one or more bits from the data structure on the host, wherein the first one or more bits have been updated by the host to indicate that the second pair of slots has been read from most recently by the host;
read the second one or more bits, wherein the second one or more bits indicate that a first slot of the first pair of slots has been written to more recently;
increment the value of the counter to a new latest value;
write second data to a second slot of the first pair of slots based on the first one or more bits indicating that the second pair of slots has been read from most recently by the host and the second one or more bits indicating that the first slot of the first pair of slots has been written to more recently, wherein the second data includes the new latest value of the counter;
update the second one or more bits to indicate that the second slot of the first pair of slots has been written to more recently.

15. A system, comprising
A host system, comprising a first processor and a first memory medium;
A client device, comprising a functional unit, a second memory medium, and a counter;
wherein the host system and the client device are electrically coupled to allow communication;
wherein the first memory medium comprises a data structure, wherein the data structure comprises a first pair of slots, a second pair of slots, and a first one or more bits, wherein the first one or more bits indicate which pair of slots the host system has read from most recently;
wherein the counter is useable to indicate which slot has been most recently written to by the client device;
wherein the second memory medium comprises a second one or more bits, wherein the second one or more bits indicate which pair of slots has been written to by the client device most recently, and which slot of each pair of slots has been written to by the client device more recently;
wherein the functional unit is configured to:
read the first one or more bits from the first memory medium;
read the second one or more bits from the second memory medium;
increment the counter to a latest value;
write data to a slot in the data structure on the first memory medium of the host system, wherein the slot is determined based on reading from the first one or more bits and the second one or more bits, wherein the slot comprises whichever slot has not been written to more recently of the pair of slots which has not been read from most recently, and wherein the data includes the latest value of the counter;
update the second one or more bits to reflect any change in which pair of slots has been written to by the client device most recently and which slot of each pair of slots has been written to by the client device more recently after writing data to the slot;
wherein the first memory medium further comprises program instructions executable by the first processor to:
determine which pair of slots has been written to by the client device most recently based on the counter value for each slot of the data structure;

update the first one or more bits to indicate that the host system has most recently read from the pair of slots most recently written to by the client device;

determine which slot in the determined pair of slots has been written to most recently based on the counter value for each slot in the determined pair of slots;

read data from the slot determined to have been written to by the client device most recently.

16. The system of claim 15, wherein the counter is stored on the second memory medium.

17. A computer-accessible memory medium comprised on a client device, wherein the memory medium comprises program instructions executable to transfer data to a host, wherein the host stores a data structure comprising a first pair of slots and a second pair of slots, wherein the program instructions are executable by the client device to:

read first information from the host, wherein the first information indicates a status of read operations from the data structure by the host;

read second information from the memory medium, wherein the second information indicates a status of write operations to the data structure by the client device;

determine which slot of the data structure should be written to based on the first information and the second information;

increment a value of a counter to a latest value, wherein the value of the counter is useable to indicate which slot has been written to most recently;

write first data to the determined slot, wherein the first data includes the latest value of the counter;

update the second information to indicate that the determined slot has been written to most recently, wherein the first information indicates from which pair of slots the host has most recently read, and wherein the second information indicates which slot of each pair of slots has been written to most recently by the client device.

18. The computer-accessible memory medium of claim 17, wherein said determining which slot of the data structure should be written to comprises determining which slot has not been written to more recently of the pair of slots that has not been read from most recently.

19. The computer-accessible memory medium of claim 17, wherein the counter is stored on the memory medium.

* * * * *